W. M. BLAIR.
Corn-Shelling Machine.
No. 199,496. Patented Jan. 22, 1878.
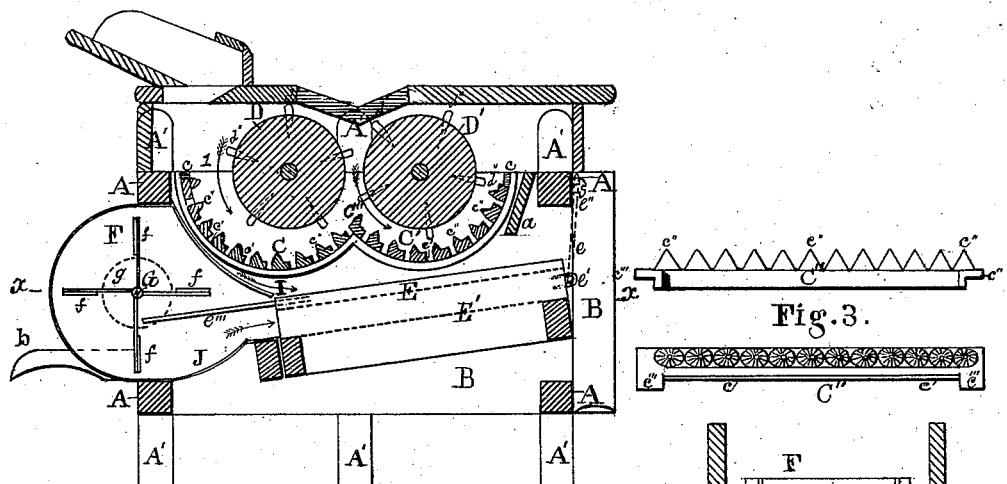
Fig. 1.
Fig. 3.
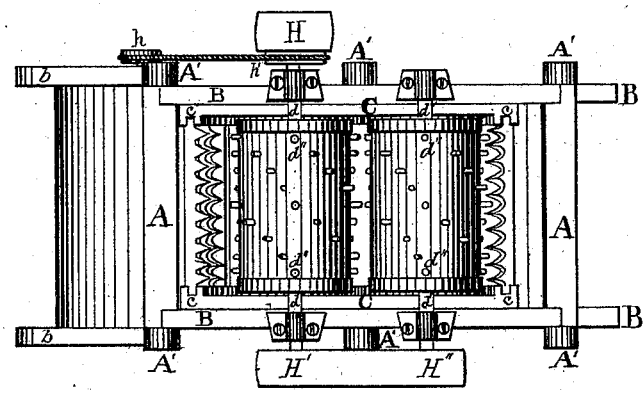
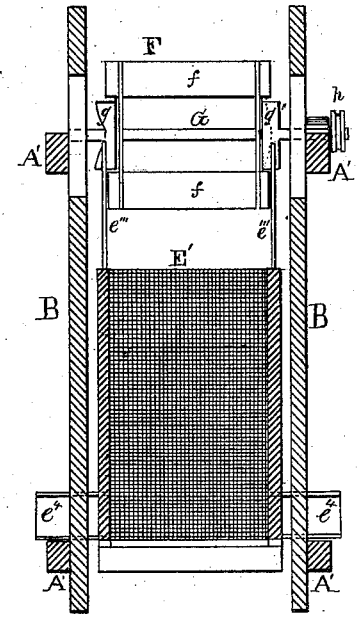
Fig. 2. Fig. 4.
Witnesses
C. M. Connell
W. H. Singleton
Inventor
Wm. M. Blair
Per Wm. R. Singleton
Atty.

UNITED STATES PATENT OFFICE.

WILLIAM M. BLAIR, OF WILLIAMSPORT, MARYLAND.

IMPROVEMENT IN CORN-SHELLING MACHINES.

Specification forming part of Letters Patent No. 199,496, dated January 22, 1878; application filed November 6, 1877.

*To all whom it may concern:*

Be it known that I, WM. M. BLAIR, of Williamsport, in the county of Washington and State of Maryland, have invented certain new and useful Improvements in Corn-Shellers; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to improvements in corn-shellers for shelling and cleaning the corn from the ear with the shucks on when fed into the hopper; and consists in the arrangements of the cylinders, on which are the teeth and the bars, supplied with teeth also, in such relation to each other that the entrance to the cylinder is wide enough to receive the full ear with its shuck, and as it passes under the cylinder the space between the concave bars and the cylinder is gradually lessened, so that the cob, after being divested of the shuck, will pass under the second cylinder, and all of the grains be shelled from the cob, and the cob be dropped down upon the riddles. The concave bars allow the shelled corn and shucks to drop through as fast as they are stripped and shelled from the cob, all of which will be more fully described hereinafter.

Figure 1 is a longitudinal vertical section. Fig. 2 is a top or plan view, with the cover removed to show the interior. Fig. 3 represents two views of the concave bars. Fig. 4 is a horizontal section on line $x\ x$ of Fig. 1.

A represents a strong frame, supported on clamp-legs A', which sustain all the parts by any competent fastenings, such as heavy screws or bolts. B B are the sides, which may be of one or more pieces, having at one end handles $b\ b$, projecting endwise for the convenience of handling, and the other end can be hollowed underneath for hand-hold. C C' are cast-metal plates of the form seen in Fig. 1, having annular grooves $c\ c$.

In C', Fig. 1, the groove $c$ is concentric, or nearly so, with the periphery of the cylinder D', which travels within. In C the annular groove is not concentric with its cylinder D, but is so situated that the entrance shown by the arrow No. 1 is very much wider than on the opposite side of the cylinder, so that the ears of corn, with their shucks upon them, coming from the hopper above, however they may be promiscuously thrown into it, will fall lengthwise between the teeth on the cylinder D and the teeth on the bars, there being ample space to admit the largest ears; but as they pass under the cylinder D the shucks will be torn from the ears, and the ears will pass to the bridge C'' between the cylinders, and be forced by the teeth of the first cylinder into contact with the next cylinder, and the grains will be separated from the cob.

The plates C C' are on opposite sides of the frame, and have suitable bearings for the journals of the cylinders D D'. Between these plates are inserted cast-metal bars C'', having teeth $c''\ c''$, as seen in upper part of Fig. 3, and projections $c'''\ c'''$, leaving between the bars spaces $c'\ c'$, through which the grains of corn can drop. The teeth $d''\ d''$ are so arranged on the cylinders D D' that they properly mesh with the serrated surfaces of the bars C'', and take all of the grains from the cob.

The concaves, being perforated throughout, permit the grain to escape as fast as shelled, and thus prevent the jamming and crushing of the grains which would otherwise be the consequence of the gradually-diminishing space between the cylinders and the concaves.

Below the shelling apparatus are arranged the riddles E E', suspended at the outer end by rods $e\ e$, fastened by staples $e'\ e'$ and screws $e''\ e''$. At the other end of the riddle-frame are rods $e'''\ e'''$, the outer ends of which impinge upon cam-surfaces $g\ g$, which are attached to the fan-shaft G, so that a shaking motion is given to the riddle as the fan is in motion.

F represents the ordinary fan secured on shaft G, which has at one end pulley $h$, which receives the cord from pulley $h'$ on the shaft $d$ of cylinder D, adjoining which, on the same shaft, is driving-pulley H, and on the opposite end of shaft $d$ is another pulley, H', having a band running to a corresponding pulley, H'', on the shaft $d'$ of cylinder D'. Thus, as motion is communicated to cylinder D, the fan is operated, and also the other cylinder, D', rotates in the same direction, as shown by the arrows in Fig. 1.

I represents an apron to guide any grains of corn which may be separated from the cob when the shuck is first torn, and carry them to the riddle E. J is a continuation of the fan-case, to convey the blast over the riddle, as seen by the arrow.

I claim—

The combination, with the toothed cylinders D D', of the toothed perforated concaves C C', the latter placed nearer its cylinder than the former, substantially as set forth.

In testimony that I claim the foregoing as my own I affix my signature in presence of two witnesses.

WM. M. BLAIR.

Witnesses:
P. L. LEMEN,
ELI WOLTZ.